M. H. BIRD.
CORN PLANTER.
APPLICATION FILED APR. 19, 1911.
1,007,517.
Patented Oct. 31, 1911.
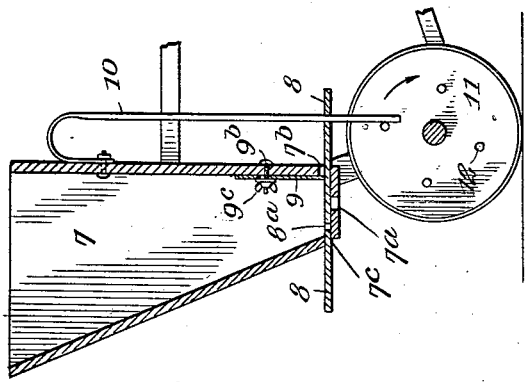
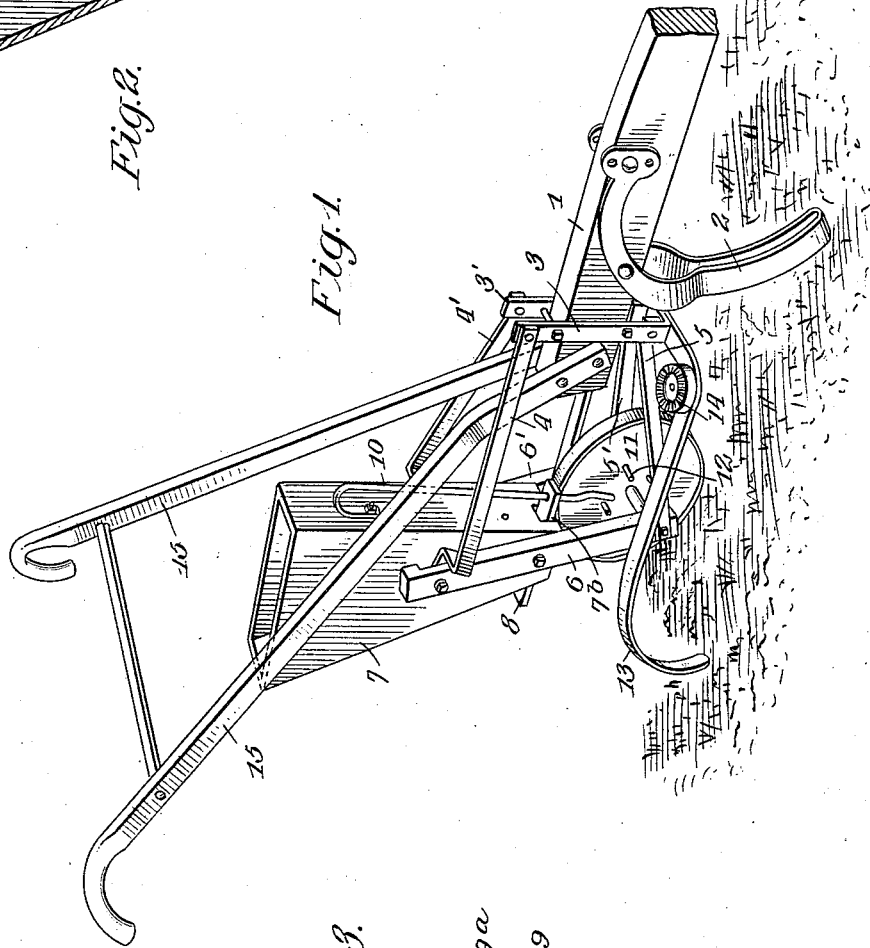
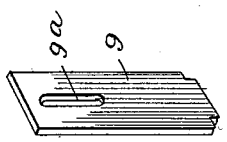
WITNESSES
S. E. Wade
L. A. Stanley
INVENTOR
MICHAEL H. BIRD
BY Munn & Co.
ATTORNEYS

UNITED STATES PATENT OFFICE.

MICHAEL H. BIRD, OF SANDERSVILLE, GEORGIA.

CORN-PLANTER.

1,007,517.  Specification of Letters Patent.  Patented Oct. 31, 1911.

Application filed April 19, 1911. Serial No. 622,042.

*To all whom it may concern:*

Be it known that I, MICHAEL H. BIRD, a citizen of the United States, and resident of Sandersville, county of Washington, and State of Georgia, have invented certain new and useful Improvements in Corn-Planters, of which the following is a specification.

My invention relates to improvements in devices for planting corn, and it consists in the combinations, constructions and arrangements herein described and claimed.

The main object of my invention is to provide a simple means for feeding the corn at stated intervals. To this end, I arrange a hopper having a sliding feed mechanism adapted to be operated by the colter wheel.

A further object of my invention is to provide a planter in which the hopper and feed mechanism are loosely connected to the main frame so that when an obstruction is met, the feed mechanism may rise to pass over it, automatically settling again into the furrow when the obstruction is passed.

Further objects and advantages will appear in the following specification and the novel features of the device will be particularly pointed out in the appended claim.

My invention is illustrated in the accompanying drawings in which—

Figure 1 is a perspective view showing one embodiment of my invention, Fig. 2 is a detail section through the feed hopper; and Fig. 3 is a perspective view of the adjustable gate.

In carrying out my invention, I provide a plow beam 1, to which a plow standard 2 is attached. At the rear end of the plow beam are secured two uprights 3 and 3'. To the upper ends of the uprights are secured the pivoted members 4 and 4', while to the lower ends are small pivoted members 5 and 5'. The ends of the members 4 and 5 are pivotally secured to a supporting member 6. A small supporting member 6' is connected in a similar manner to the members 4' and 5' on the opposite side.

Between the supporting members 6 and 6' is secured a feed hopper 7 of the shape shown in the drawing. This feed hopper is provided with an opening $7^a$ in its bottom through which the corn may be fed. It is also provided with openings $7^b$ and $7^c$ through which a slide 8 is adapted to reciprocate. This slide has an opening $8^a$ which may be brought into registration with the opening $7^a$. The opening $7^b$ may be partially closed by means of an adjustable gate 9 which is provided with a slot $9^a$ through which a bolt $9^b$ projects. This gate may be made of leather or any other suitable material, and is held in position by means of the thumb nut $9^c$. Secured to a forward part of the hopper 7 is a spring rod 10 whose lower end projects through the opening in the slide 8.

Journaled between the lower ends of the supporting members 6 and 6' is the axle of a colter wheel 11 which is provided with a series of pins 12 arranged at intervals. These pins project outwardly and are arranged to engage the end of the spring rod 10 as the wheel is turned in the direction of the arrow in Fig. 2. Secured to the members 3 and 3' are the rearwardly extending blades 13 for covering the grain after it is deposited. Only one of these blades is shown in the drawings, but it will be understood that there is a similar one on the opposite side of the device. Each blade 13 is provided with an adjustable joint 14 for permitting a lateral movement. The planter is provided with the usual handles 15.

From the foregoing description of the various parts of the device, the operation thereof may be readily understood. The hopper 7 is filled with grain and the device is drawn along in the usual manner. As the pins come in contact with the spring rod 10, the slide 8 is drawn forwardly until the openings $8^a$ and $7^a$ register, when a portion of the grain will be permitted to fall. When the pin has passed the spring rod 10, the latter causes the slide 8 to resume its normal position. Since these pins are placed at regular intervals, the grain will be fed regularly. As before stated, when the wheel 11 meets an obstacle, the wheel, together with the supports 6 and 6', and the hopper will ride over the obstruction, this being permitted by the pivoted connection with the members 3 and 3'. If the distance between the furrows should vary, the blades 13 may be adjusted by unloosening the joint 14, moving the blades to a proper position and again tightening the joint.

I am aware that other forms of the device based upon the same general plan might be made, but I consider as my own all such modifications as may fairly fall within the spirit and scope of the invention.

I claim:

In a corn planter, a plow-beam, a plow-standard carried thereby, rearwardly extending blades secured to said plow-beam, the ends of said rearwardly extending blades being turned downwardly, an upright secured to the plow-beam on each side thereof, a hopper, supporting members therefor on each side thereof, links pivotally connecting the bottoms of said uprights with the bottoms of said supports, links pivotally connecting the tops of said uprights with the tops of said supports, a colter-wheel having its axis in line with the pivotal connections of the lower links with said supports, said colter-wheel being between the ends of said blades and said plow-standard, a slide carried by said hopper, a spring for operating the slide, and pins carried by the colter wheel for actuating the spring.

MICHAEL H. BIRD.

Witnesses:
 P. E. GROSS,
 MACK SESSIONS.